Aug. 22, 1944.                J. A. FORBES                2,356,233
                                BRAKE
                          Filed July 6, 1942            2 Sheets-Sheet 1
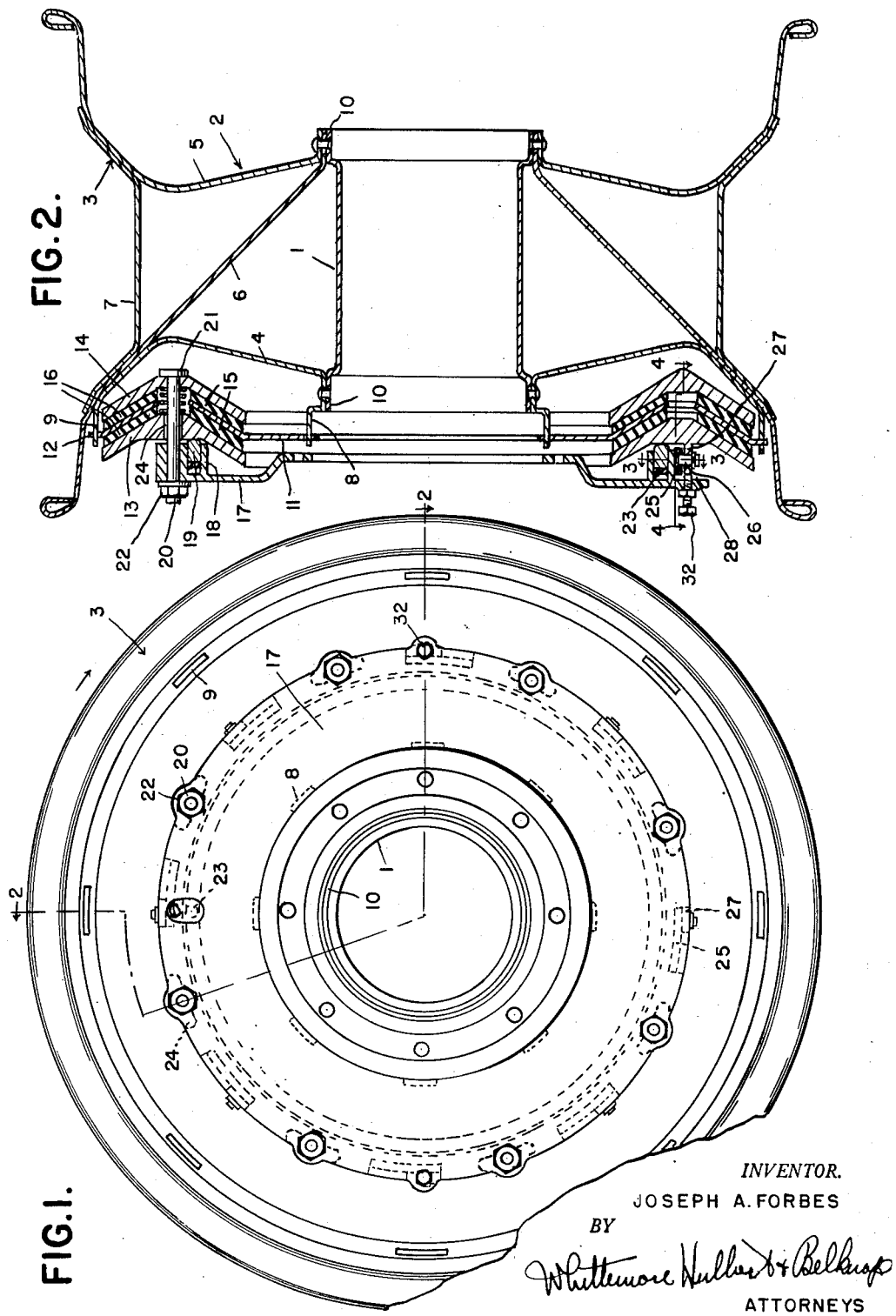
INVENTOR.
JOSEPH A. FORBES
BY
*Whittemore Hulbert & Belknap*
ATTORNEYS Aug. 22, 1944.  J. A. FORBES  2,356,233
BRAKE
Filed July 6, 1942  2 Sheets-Sheet 2
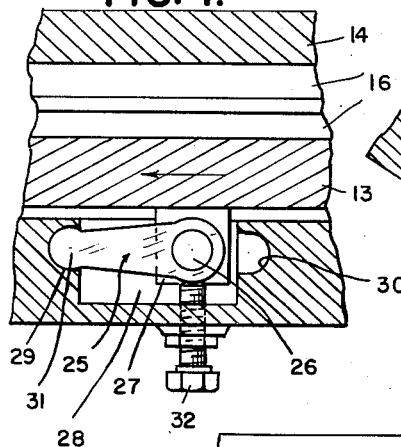
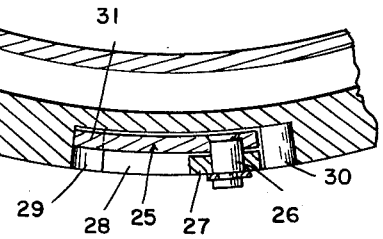
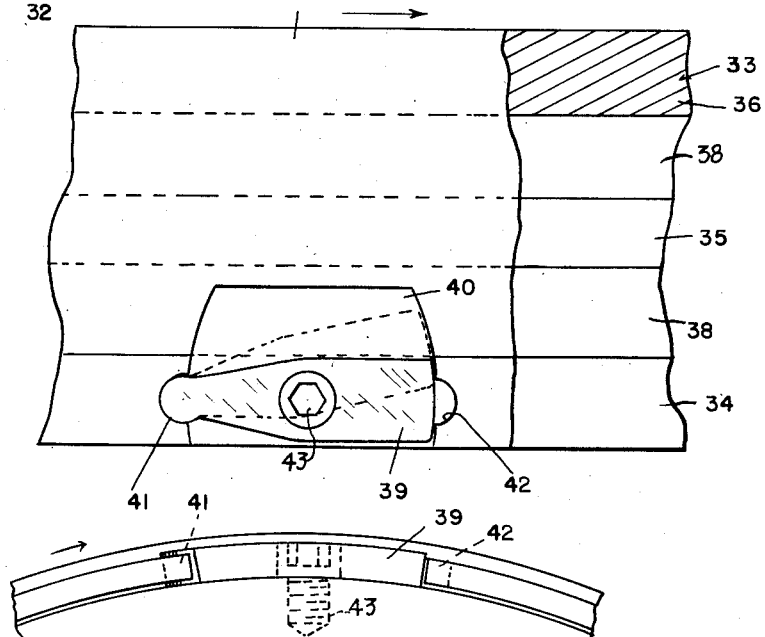
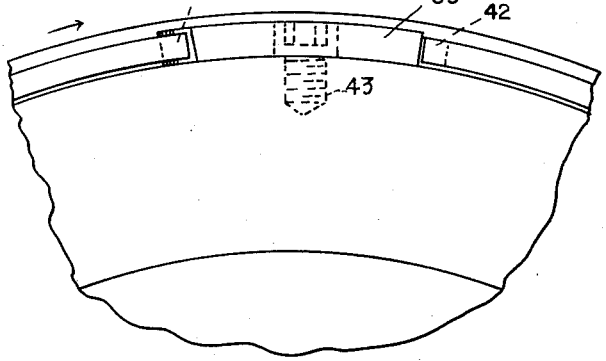
INVENTOR.
JOSEPH A. FORBES
ATTORNEYS Patented Aug. 22, 1944

2,356,233

UNITED STATES PATENT OFFICE 2,356,233

BRAKE

Joseph A. Forbes, Detroit, Mich., assignor to Kelsey-Hayes Wheel Company, Detroit, Mich., a corporation of Delaware Application July 6, 1942, Serial No. 449,927

1 Claim. (Cl. 188—72)

The invention relates to brakes and refers more particularly to brakes for wheels and especially aircraft wheels.

The invention has for one of its objects to provide a brake embodying self-energizing means which is automatically operable upon the initial application of braking pressure to increase the braking pressure.

The invention has for another object to provide a brake in which the self-energizing means forms an anchor which provides for limited angular movement of the friction members relative to each other.

The invention has for a further object to provide a brake of the disc type constructed and arranged to be powerful and compact.

With these and other objects in view, the invention resides in the novel features of construction and combinations and arrangements of parts as more fully hereinafter set forth.

In the drawings:

Figure 1 is an elevation of a wheel and brake embodying the invention;

Figure 2 is a cross section on the line 2—2 of Figure 1;

Figures 3 and 4 are cross sections on the lines 3—3 and 4—4, respectively, of Figure 2;

Figure 5 is an elevation of a brake showing another embodiment of the invention;

Figure 6 is a plan view thereof, partly in section.

The brake embodying the invention is particularly applicable to wheels for aircraft and more especially airplanes. As illustrated, the wheel comprises the hub 1, the wheel body 2, and the tire carrying rim 3. The body and rim are shown as formed of the sheet metal inboard and outboard side elements 4 and 5, respectively, the sheet metal reinforcing element 6, and the sheet metal ring 7. The outboard side element 5 forms a part of both the body and rim. The reinforcing element 6 forms a reinforcing part of the body and also a part of the rim. The ring 7 extends between and is secured to parts of the rim forming portions of the outboard side element and the reinforcing element. The inboard side element 4 forms part of the body and has the axially extending inner and outer projections 8 and 9 facing in an inboard direction. The body forming portions of the inboard and outboard side elements are fixedly secured to the enlarged portions 10 of the hub 1.

The brake is of the disc type and comprises rotatable friction members which are rotatable with the wheel and non-rotatable friction members engageable with opposite sides of the rotatable friction members and carried by a support upon an axle upon which the wheel hub is journaled. In detail, 11 and 12 are substantially concentric inner and outer sheet metal discs which are apertured at their inner and outer edges respectively to be axially slidable on the projections 8 and 9, respectively. 13 and 14 are non-rotatable inboard and outboard coaxial discs substantially concentric with and located at opposite sides of the rotatable discs 11 and 12. Each of the discs 13 and 14 has balanced frusto-conical friction surfaces converging toward each other axially in an outboard direction and engageable with the correspondingly shaped linings 15 and 16 secured to the opposite sides of correspondingly shaped frusto-conical portions of the rotatable discs 11 and 12, respectively. The discs 13 and 14 are preferably formed of some metal other than sheet metal to be substantially rigid and they are concentric with and carried by the supporting member 17 which, as above stated, is fixedly secured to the axle. The supporting member is formed with the concentric annular cylinder 18 within which is slidable the annular piston 19 for engaging the central or hub portion of the inboard disc 13. The supporting member carries and has extending axially therethrough the bolts 20 upon which the discs 13 and 14 are mounted. These bolts extend through the space between the rotatable discs 11 and 12 and are provided at their outboard ends with the heads 21 for abutting the outboard side of the central or hub portion of the outboard disc 14. Nuts 22 threaded upon the inboard ends of the bolts secure the bolts to the supporting member. The annular cylinder 18 is adapted to be connected to a suitable master cylinder through the passage 23 formed in the supporting member between adjacent bolts. The discs 13 and 14 are yieldably urged in opposite directions by coil springs between the discs and encircling the bolts 20.

The outboard disc 14 is held from rotation by means of the bolts 20 and the supporting member. The inboard disc 13, however, has a limited angular movement, the central or hub portion of this inboard disc being formed with the arcuate slots 24 through which the bolts 20 extend. The inboard disc 13 is anchored upon the supporting member 17 by the compression links 25 which are angularly spaced around the annular cylinder 18 at equal distances from each other. The compression links are located preferably midway between the bolts and extend circumferentially. The compression links are pivotally connected at corresponding ends by the pins 26 to the projections 27 integral with and extending axially in an inboard direction from the central or hub portion of the inboard disc 13. The compression links have their opposite ends pivoted or fulcrumed upon the supporting member. As shown, the supporting member is formed at its outer edge with the recesses 28 for receiving the compression links 25 and axial projections 27 and the recesses have at their ends the generally semi-cylindrical concave portions 29 and 30 for interchangeably receiving the correspondingly shaped ends 31 of the compression links. In the present instance, with the wheel and the rotatable discs rotating in the direction of the arrows in Figures 1 and 4, the concave portions 29 engage the ends 31 of the compression links. If the wheel and the rotatable discs were rotating in the opposite direction, the concave portions 30 would be used.

With this construction, the longitudinal axes of the compression links 25 preferably lie in the same plane at right angles to the axis of the brake when the parts of the brake are in their off or inoperative position. With the wheel and the rotatable discs of the brake rotating in the direction of the arrows of Figures 1 and 4 and when braking fluid under pressure is forced into the annular cylinder 18, the annular piston 19 moves the inboard disc 13 axially in an outboard direction into contact with the rotatable discs 11 and 12 so that the inboard disc is caused to move angularly with the rotatable discs. During the axial movement of the inboard disc, the compression links are swung laterally about their fulcrums upon the mounting member and during the subsequent angular movement of the inboard disc the compression links are further swung and the rotatable discs are moved axially into engagement with the outboard disc. As a result, the compression links become energized and increase the axial pressure of the inboard disc upon the rotatable discs and of the rotatable discs on the outboard disc to thereby greatly increase the braking effectiveness.

For the purpose of limiting the return movement of the inboard disc to its off or inoperative position, I have provided suitable stops upon the mounting member 17 which are engageable with the inboard disc. These stops, as shown, are angularly spaced set screws or bolts 32 threadedly engaging the mounting member 17 and adapted to abut the inboard ends of the projections 27. By adjusting the set screws or bolts 32 and the nuts 22, the angle of inclination of each of the compression members to the plane of the mounting member can be varied to secure various degrees of energization of the compression members and the desired clearance between the non-rotatable and rotatable discs can be secured. It is apparent that the axes of the pivot pins for the compression links cannot lie in an inboard direction beyond the plane at right angles to the axis of the brake passing through the middle points of the bearing surfaces of the ends 31.

The brake illustrated in Figures 5 and 6 is operable in the same manner as the brake of Figures 1 to 4, inclusive, but the self-energizing means for increasing the pressure of the discs upon each other is rotatable and anchors the disc which is initially axially moved to another disc, both of which may rotate together and one of which may move angularly relative to the other to secure the energization. More in detail, the brake comprises the rotatable friction members 33 and 34 in which the former is adapted to be secured to the wheel to rotate therewith and the non-rotatable friction member 35 therebetween and adapted to be secured to the support upon the axle upon which the wheel hub is journaled. The friction member 33, as illustrated, is a cup-shaped member having the disc 36 and the annulus 37. The friction member 34 is in the nature of a disc located concentrically within the free edge of the annulus. The friction member 35 is in the nature of a disc having the friction linings 38 secured to its opposite sides and engageable with the friction surfaces of the discs 34 and 36. In the off or inoperative positions of the parts, there is the usual slight clearance between the friction linings and the friction faces. The friction member 33 is rotatable in the direction indicated by the arrows of Figures 5 and 6. The friction member 34 is anchored to and supported by the friction member 33 by the compression links 39 which are angularly spaced about the annulus 37 and are located in the recesses 40 formed in the annulus. It will be noted that opposite ends of the recesses are formed with semi-cylindrical concave portions 41 and 42 for interchangeably receiving the correspondingly shaped ends of the compression links, this construction being the same as that previously described. Each compression link is pivotally connected to the friction member 34 by suitable means, such as the bolt 43 having its shank extending radially of and threadedly engaging the friction member 34.

It will be noted that with this construction and with the friction members 33 and 34 rotating in the direction of the arrows of Figures 5 and 6, axial pressure upon the friction member 34 to move the same into engagement with the friction member 35 results in swinging of the compression links 39 about the concave portions 41. Upon frictional engagement of the friction member 34 with the friction member 35 the friction member 34 will be retarded and the compression links will be further swung and operate to greatly increase the axial pressure of the friction member 34 upon the friction member 35 and the axial pressure of the friction member 35 upon the disc 36 of the friction member 33.

What I claim as my invention is:

In a brake, relatively rotatable discs, a supporting member for one of said discs formed with an annular cylinder, an annular piston slidable within said cylinder and engageable with one of said discs for axially moving the same into engagement with the other of said discs, and peripherally extending compression links spaced angularly about said annular cylinder and pivotally engaging said supporting member and said axially movable disc, said links upon movement of said axially movable disc into engagement with the other of said discs being adapted to swing relative to said supporting member to increase the pressure of said axially movable disc upon the other of said discs.

JOSEPH A. FORBES.